United States Patent [19]

Suzuki et al.

[11] 4,182,824

[45] Jan. 8, 1980

[54] CURABLE ORGANOPOLYSILOXANE COMPOSITIONS

[75] Inventors: Toshio Suzuki; Akito Nakamura, both of Ichihara, Japan

[73] Assignee: Toray Silicone Company, Ltd., Tokyo, Japan

[21] Appl. No.: 961,428

[22] Filed: Nov. 16, 1978

[30] Foreign Application Priority Data

Dec. 29, 1977 [JP] Japan .................................. 52-159100

[51] Int. Cl.$^2$ ............................................. C08G 77/06
[52] U.S. Cl. .................................. 528/15; 260/37 SB;
260/45.75 R; 260/45.75 P; 528/14; 528/31;
528/32
[58] Field of Search ........................ 528/14, 15, 31, 32

[56] References Cited

U.S. PATENT DOCUMENTS 4,032,502  6/1977  Lee et al. ................................ 528/15

*Primary Examiner*—Melvyn I. Marquis
*Attorney, Agent, or Firm*—Robert L. McKellar

[57] ABSTRACT

What is disclosed is a curable organopolysiloxane composition based on the platinum catalyzed silicon hydride addition to unsaturated groups on silicon, cure system. The novel feature is the use of a silane to enhance the adhesion of the curable material to many substrates. The silane has the general formula

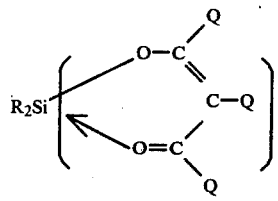

2 Claims, No Drawings

CURABLE ORGANOPOLYSILOXANE COMPOSITIONS

BACKGROUND OF THE INVENTION

This invention concerns curable organopolysiloxane compositions with good adhesion. More specifically, this invention concerns good adhering organopolysiloxane compositions which cure by an addition reaction between lower alkenyl groups bonded to silicon atoms and hydrogen atoms bonded to silicon atoms.

Various combinations of organopolysiloxane compositions which cure by the above-mentioned addition reaction are known. However, these organopolysiloxane compositions generally adhere poorly to other materials. In order to adhere these organopolysiloxanes, the adhering surface must be treated with a primer beforehand. This is disadvantageous in terms of the operation's time, labor and cost.

Although numerous organopolysiloxane compositions which are self-adhering due to a combination of silane and polysiloxanes have been proposed, they suffer shortcomings such as requiring excessively high curing temperatures; having poor adhesion to plastics and durability.

The object of this invention is to offer a good adhering organopolysiloxane which cures by an addition reaction between lower alkenyl groups bonded to silicon atoms and hydrogen atoms bonded to silicon atoms. More specifically, the object of this invention is to offer organopolysiloxane compositions which adhere very well to plastics, metals and ceramics without a prior primer treatment of the surface of the material to be bonded.

In other words, this invention is an organopolysiloxane composition consisting essentially of (a) an organopolysiloxane having at least two lower alkenyl groups bonded to silicon atoms; (b) a hydrogen-containing organopolysiloxane having at least two hydrogen atoms bonded to silicon atoms wherein there is provided from 0.5 to 2.0 silicon-bonded hydrogen atoms per alkenyl group in component (a); (c) a silane having the general formula

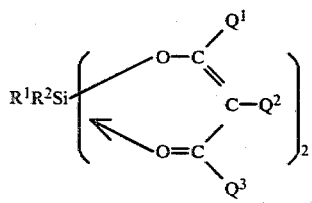

wherein $R^1$, $R^2$, $Q^1$, $Q^2$ and $Q^3$ are selected independently from the group consisting of hydrogen atoms, lower molecular weight alkyl radicals, alkenyl radicals, aryl radicals, alkoxy radicals and the partical hydrolysis products from the alkoxy radicals and, (d) an addition reaction catalyst.

The components of the organopolysiloxane compositions of this invention are commercially available materials. Component (a) has the general formula

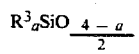

wherein a has a value of 1–3 and contains at least 2 lower alkenyl groups per molecule with the remainder being unsubstituted or substituted hydrocarbon radicals. Component (a) may be linear, cyclic, branched or three dimensional. It may be a homopolymer or copolymer. The degree of polymerization of (a) must result in a viscosity of 0.01–1,000 pa·s or preferably 0.05–100 pa·s at 25° C. $R^3$ is a saturated or unsaturated monovalent hydrocarbon radical.

Examples of $R^3$ as a lower alkenyl group are vinyl, allyl, 1-propenyl and isopropenyl. Vinyl groups are preferred.

At least 2 of these lower alkenyl groups should be present on each molecule of the organopolysiloxane. Also, at least 2 of these lower alkenyl groups should be placed as far apart as possible.

Examples of $R^3$ other than the lower alkenyl groups are alkyl groups such as methyl, ethyl, n-propyl and butyl; aryl groups such as phenyl; analogous groups substituted with halogen atoms; and other hydrocarbon groups. A majority of $R^3$ other than the lowr alkenyl groups should be methyl groups.

Component (b) has the general formula

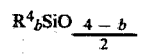

wherein b has a value of 1–3, and contains at least 2 hydrogen atoms per molecule. Component (b) may be linear, branched, cyclic or three dimensional. It may be either a homopolymer or a copolymer. The degree of polymerization should result in a viscosity within the range 0.001–10 pa·s or preferably 0.005–5 pa·s at 25° C. $R^4$ may be hydrogen or unsubstituted or substituted hydrocarbon radicals.

The quantity of component (b) must be sufficient to give 0.5 to 2.0 silicon-bonded hydrogen atoms per lower alkenyl group in component (a). It is preferred that the quantity of component (b) be sufficient to provide 0.7–1.5 silicon-bonded hydrogen atoms. Furthermore, it should be noted that a normally cured product cannot be obtained unless the sum of the number of lower alkenyl groups bonded to silicon atoms per molecue of (a) and the number of hydrogen atoms bonded to silicon atoms per molecule of component (b) is 5 or larger.

Component (c), the silane has the general formula

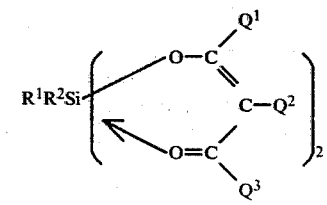

and it or its partial hydrolysis product constitutes the characteristic aspect of this invention. It is an indispensable component for imparting strong adhesiveness to the product.

Examples of $R^1$, $R^2$, $Q^1$, $Q^2$ and $Q^3$ in the general formula are hydrogen atoms, methyl, ethyl, propyl, isopropyl, vinyl, phenyl, methoxy, ethoxy, propoxy, isopropoxy and butoxy. Some specific examples are as follows:

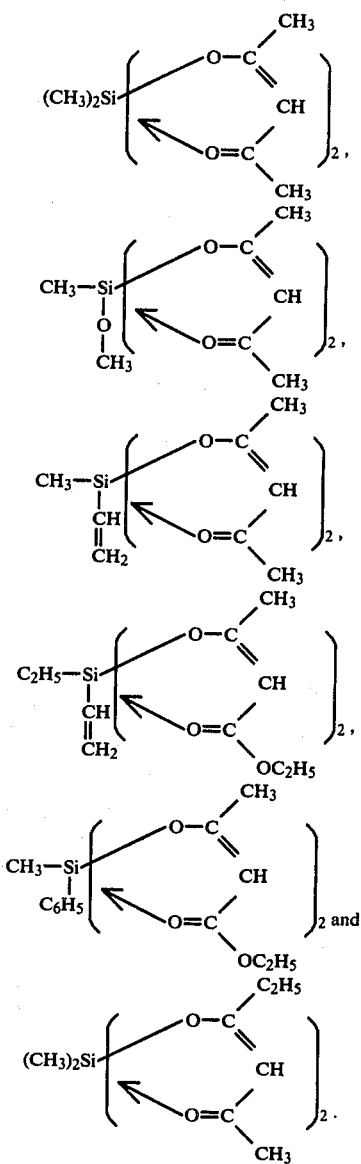

The process for producing component (c) is as follows. A dichlorodialkylsilane $RR^1SiCl_2$ is dissolved in benzene. β-diketo compounds such as acetylacetone or ethyl acetoacetate are added by dropping them into the mixture and mixing under reflux at 85°–90° C. The hydrochloric acid by-product is removed by acid acceptors such as triethylamine or pyridine.

The amount of component (c) useful in this invention is 0.1–10 parts by weight per 100 parts by weight of the total of components (a) and (b). If the component (c) quantity is too small, insufficient adhesiveness is imparted to the product of the invention. When component (c) is in excess, the practical significance of the component is lost and curing can also be inhibited.

With respect to the addition reaction catalyst, component (d), any catalysts effective in the addition of hydrogen atoms bonded to silicon atoms to lower alkenyl groups bonded to silicon atoms, so-called hydrosilation, may be used for this purpose. Specific examples of these catalysts are finely divided elemental platinum, finely divided platinum dispersed on carbon powder, chloroplatinic acid, coordination compounds between chloroplatinic acid and olefins, the coordination compound of chloroplatinic acid and vinylsiloxane, tetrakis(triphenylphosphine)palladium, a mixture of palladium black and triphenylphosphine or rhodium catalysts.

For purposes of this invention, component (d) is used in an amount of 0.1–200 parts by weight based on the quantity of the platinum group metal per one million parts by weight of the total of components (a) and (b).

Beside the above-mentioned indispensable components, various fillers can be combined with the composition of this invention as required. Examples of these fillers are fumed silica, hydrophobicized fumed silica, precipitated silica, hydrophobic precipitated silica, fine quartz powder, diatomaceous earth, talc, aluminum silicate, alumina, aluminum hydroxide, calcium carbonate, zinc oxide, titanium dioxide, ferric oxide, fiberglass, glass beads and glass balloons. In addition, benzotriazoles, 2-ethynylisopropanol, phenylhydrazine, and other cure-retardants; manganese carbonate, carbon black and other fire-retardants; cerium hydroxide, ferric oxide and other thermal stabilizing agents; oil resistance stabilizing agents and pigments may also be combined with the compositions of the invention. The addition of various organopolysiloxanes and silanes to the compositions of this invention for purposes other than improving adhesion is also permissible.

The curable organopolysiloxane compositions of this invention are prepared by simply mixing components (a)–(d) as well as any desired fillers and additives. It is recommended that the composition of the invention be divided into two packages for convenient storage. Any desired division is acceptable. For example, it is recommended that the composition be divided into a package of components (a), (c) and (d) and another package of (b) or a package of (a) and another package of (b), (c) and (d) for storage.

The composition of this invention cures when all the indispensable components are mixed and heated to a moderate temperature. It assumes the form of an elastomer, gel or solid upon curing. It bonds with glass, metals, plastics and ceramics when it is in contact with these materials during curing. The utilization of the composition of this invention as bonding agents, sealants, coating agents, injection agents and impregnating agents is extremely beneficial because of the strong adhesion of the composition of this invention to various base materials.

This invention will be explained with the following experimental examples. In these examples, all the parts are parts by weight. All the viscosity values reported below are values at 25° C. unless otherwise indicated.

EXAMPLE 1

75 g. of methyltrichlorosilane (0.5 mol) and 1,000 ml. of benzene were placed in a 2 l. flask equipped with a stirrer, reflux condenser and dropping funnel. While the contents were being stirred, 16 g, of methanol (0.5 ml) were added from the dropping funnel.

Next, 100 g. (1 mol) of acetylacetone were added from the dropping funnel. After 10 minutes of stirring, 151.5 g. (1.5 mol) of triethylamine were introduced into the flask.

The flask was then heated and refluxed for 2 hours at 80°–90° C.

After this reaction mixture had cooled, the hydrochloric acid salt of triethylamine was removed by filtration and the benzene and unreacted triethylamine were removed by distillation. A compound with formula (I) was obtained.

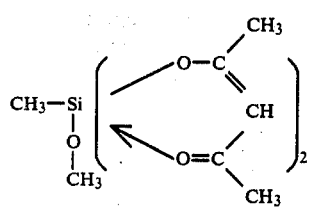

1,000 ml. of benzene and 70.5 g. (0.5 mol) of methylvinyldichlorosilane were placed in a 2 l flask equipped with a stirrer, reflux condenser and dropping funnel. While the contents were being stirred, 130 g. (1 mol) of ethyl acetoacetate were added from the dropping funnel to bring about a reaction.

After the termination of this addition, 151.5 g. (1.5 mol) of triethylamine were added by addition from the dropping funnel into the flask and the flask was then refluxed for two hours at 80°–90° C.

The hydrochloric acid salt of triethylamine was then removed by filtering the reaction mixture. The filtrate was then distilled under reduced pressure to remove the benzene and unreacted triethylamine. A compound with formula (II) was obtained as a result.

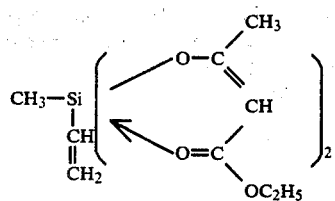

One part of the compound of formula (I) and 0.2 parts of a 3% solution of chloroplatinic acid in 2-ethylhexanol were added to a mixture consisting of 100 parts of a dimethylpolysiloxane with dimethylvinylsilyl groups at the end of the molecular chain and a viscosity of 0.5 pa·s; 3 parts of a copolymer consisting of 10 mol% trimethylsiloxy units, 50 mol% dimethylsiloxy units and 40 mol% of methylhydrogen siloxy units, and 10 parts silica aerogel. After thorough mixing, the resulting mixture was coated on plates of glass, aluminum and polyethylene terephthalate and then heated at 120° C. When this composition was peeled from the bonded material after curing, the rubber layers were broken in every case which indicated that the composition was strongly bonded with all these materials.

A comparison composition was prepared without the formula (I) compound use in the above composition. This comparison composition did not exhibit adhesion to any of the above-mentioned bonding materials.

EXAMPLE 2

0.5 parts of a 3% solution of chloroplatinic acid in 2-ethylhexanol and 1 part of the formula (I) compound from Example 1 were added to a mixture of 100 parts of a dimethylpolysiloxane with vinyl groups of the chain ends (viscosity: 12 pa·s), 5 parts of a methylhydrogen polysiloxane with the formula

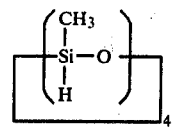

and 30 parts quartz powder to obtain a curable composition. The resulting composition was coated on a polyethylene terephthalate film with a doctor blade to form a coat 50μ thick and was cured by heating at 120° C. The resulting silicone rubber coating did not peel off when the film was flexed which proves the strength of the coated silicone rubber material.

As a comparison, this composition without the formula (I) compound from Example 1 did not adhere to the polyethylene terephthalate film and was easily peeled off when bent.

EXAMPLE 3

A curable composition consisting of 100 parts of a dimethyl polysiloxane terminated at both ends with dimethylvinylsiloxy units with a viscosity of 8 pa·s, 3 parts of a methylhydrogen polysiloxane defined by the following formula

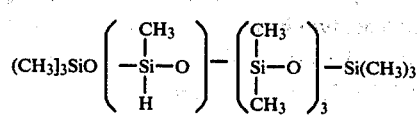

25 parts of a silica aerogel with a surface treated with hexamethyldisilazane and a specific surface area of 200 m$^2$/g and 0.2 parts of a solution of chloroplatinic acid (3%) in 2-ethylhexanol with an additional 1.5 parts of the formula (II) compounds from Example 1 were coated on an aluminum plate. After an epoxy resin place had been placed on the coating, the composition was heated to 120° C. and cured. The bonding strength of the cured object was then tested with a tensile tester. The adhesion was determined to be 16 kg/cm$^2$.

As a comparison, this composition without the additional formula (II) compound from Example 1 was coated and thermally cured. The comparison composition had an adhesion of only 2.5 kg/cm$^2$.

That which is claimed is:
1. A curable composition of matter which consists of
   (a) an organopolysiloxane having at least two lower alkenyl groups bonded to silicon atoms;
   (b) a hydrogen-containing organopolysiloxane having at least two hydrogen atoms bonded to silicon atoms wherein there is provided from 0.5 to 2.0 silicon-bonded hydrogen atoms per alkenyl group in component (a);
   (c) a silane having the general formula

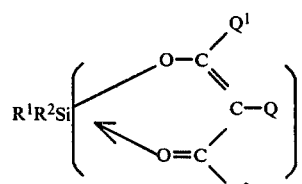

wherein $R^1$, $R^2$, $Q^1$, $Q^2$ and $Q^3$ are selected independently from the group consisting of hydrogen atoms, lower molecular weight alkyl radicals, alkenyl radicals, aryl radicals, alkoxy radicals and the partial hydrolysis products from the alkoxy radicals and, (d) a hydrosilylation catalyst.

2. A curable composition of matter which consists of
(a) an organopolysiloxane containing at least two alkenyl groups bonded to silicon atoms in the molecule which has the general formula $$R^3{}_a SiO_{\frac{4-a}{2}}$$

wherein a has a value of 1–3 and $R^3$ is substituted or unsubstituted hydrocarbon radicals containing 1–7 carbon atoms or alkenyl groups wherein the degree of polymerization is such that the organopolysiloxane has a viscosity in the range of 0.01 pa·s to 1,000 pa·s at 25° C.;

(b) a hydrogen-containing organopolysiloxane having at least two hydrogen atoms bonded to silicon atoms in the molecule wherein there is provided from 0.5 to 2.0 silicon-bonded hydrogen atoms per alkenyl group in component (a) and which has the general formula $$R^4{}_b SiO_{\frac{4-b}{2}}$$

wherein b has a value of 1–3 and $R^4$ is substituted or unsubstituted hydrocarbon radicals containing 1–7 carbon atoms or hydrogen atoms wherein the degree of polymerization is such that the hydrogen-containing organopolysiloxane has a viscosity in the range of 0.001 pa·s to 10 pa·s at 25° C.;

(c) 0.1 to 10 parts by weight based on 100 parts by weight of the combined weights of components (a) and (b) of a silane having the general formula

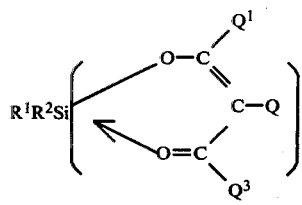

wherein $R^1$, $R^2$, $Q^1$, $Q^2$ and $Q^3$ are selected independently from the group consisting of hydrogen atoms, alkyl radicals having 1–7 carbon atoms, alkenyl radicals having 1–7 carbon atoms, aryl radicals having 1–7 carbon atoms, alkoxy radicals having 1–7 carbon atoms and the partial hydrolysis products from the alkoxy radicals and, (d) 0.1–200 parts by weight, based on the platinum metal present, of a platinum catalyst per one million parts of components (a) and (b).

* * * * *

UNITED STATES PATENT AND TRADEMARK OFFICE
CERTIFICATE OF CORRECTION

PATENT NO. : 4,182,824
DATED : January 8, 1980
INVENTOR(S) : Toshio Suzuki; Akito Nakamura It is certified that error appears in the above-identified patent and that said Letters Patent are hereby corrected as shown below:

Column 1, line 57; word reading "partical" should read "partial".

Column 2, line 20; word reading "lowr" should read "lower".

Column 3, lines 24-31; the formula reading

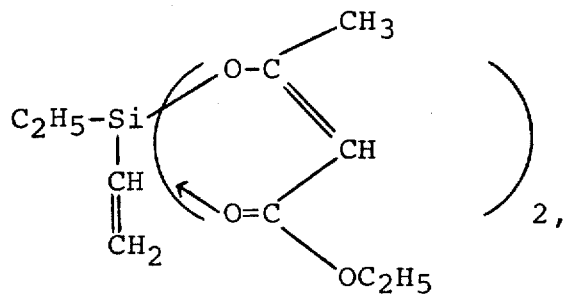

should read

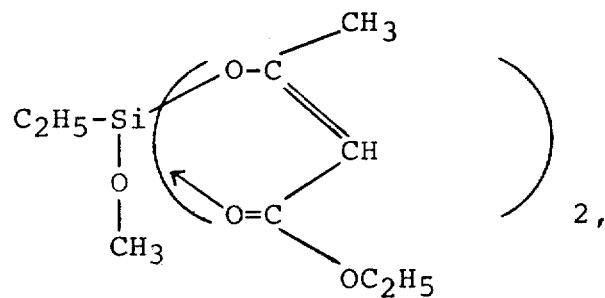

UNITED STATES PATENT AND TRADEMARK OFFICE
CERTIFICATE OF CORRECTION

PATENT NO. : 4,182,824
DATED : January 8, 1980
INVENTOR(S) : Toshio Suzuki; Akito Nakamura It is certified that error appears in the above-identified patent and that said Letters Patent are hereby corrected as shown below:

Column 6, lines 29-32; the formula reading

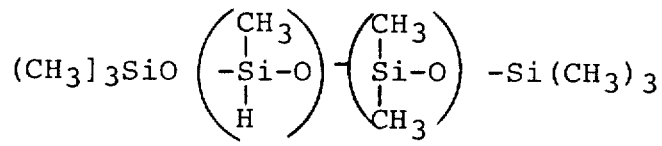

should read

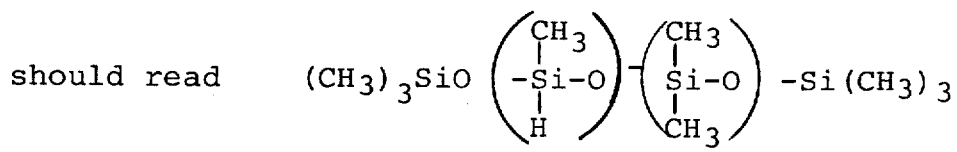

Signed and Sealed this

First Day of September 1981

[SEAL]

Attest:

GERALD J. MOSSINGHOFF

Attesting Officer — Commissioner of Patents and Trademarks